United States Patent
Peterson et al.

(10) Patent No.: US 10,805,167 B2
(45) Date of Patent: Oct. 13, 2020

(54) ACCESSIBILITY OF APPLICATIONS BASED ON NETWORK CONNECTION TYPE

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 200 days.

(21) Appl. No.: 15/144,533

(22) Filed: May 2, 2016

(65) Prior Publication Data
US 2017/0317888 A1 Nov. 2, 2017

(51) Int. Cl.
*G06F 15/173* (2006.01)
*H04L 12/24* (2006.01)
*H04L 12/26* (2006.01)
*H04L 29/08* (2006.01)

(52) U.S. Cl.
CPC .......... *H04L 41/12* (2013.01); *H04L 41/0896* (2013.01); *H04L 43/0882* (2013.01); *H04L 43/16* (2013.01); *H04L 67/04* (2013.01); *H04L 67/125* (2013.01); *H04L 67/141* (2013.01)

(58) Field of Classification Search
CPC . H04L 67/141; H04L 41/0896; H04L 67/125; H04L 43/0882; H04L 67/04; H04L 41/12; H04L 43/16
See application file for complete search history.

(56) References Cited

U.S. PATENT DOCUMENTS

| 9,426,039 B2* | 8/2016 | Yoo .................... H04L 41/5025 |
| 9,544,195 B1* | 1/2017 | Garg .................... H04L 47/627 |
| 2008/0046299 A1 | 2/2008 | Simons et al. |
| 2009/0180429 A1* | 7/2009 | Stevens ................ H04L 5/0023 370/329 |
| 2011/0276442 A1* | 11/2011 | Momtahan ............ G06Q 30/00 705/30 |
| 2012/0117478 A1* | 5/2012 | Vadde ...................... G06F 9/54 715/736 |
| 2012/0157038 A1* | 6/2012 | Menezes ................ H04W 4/26 455/405 |
| 2013/0035059 A1* | 2/2013 | Liu ..................... H04L 12/1403 455/406 |
| 2013/0196615 A1* | 8/2013 | Zalmanovitch ....... H04L 43/045 455/405 |

(Continued)

FOREIGN PATENT DOCUMENTS

| CN | 1864385 A | 11/2006 |
| CN | 104268465 A | 1/2015 |

*Primary Examiner* — Cheikh T Ndiaye
(74) *Attorney, Agent, or Firm* — Ference & Associates LLC (57) ABSTRACT

One embodiment provides a method, including: connecting, using a network connection device of an information handling device, to a network; identifying, using a processor, a connection type of the network; identifying, using a processor, at least one characteristic of an application accessible by the information handling device; and modifying, based upon the connection type and at least one characteristic of an application, accessibility of the application. Other aspects are described and claimed.

18 Claims, 3 Drawing Sheets

(56) References Cited

U.S. PATENT DOCUMENTS

| | | | |
|---|---|---|---|
| 2014/0006347 A1* | 1/2014 | Qureshi | H04L 63/20 707/621 |
| 2014/0057589 A1* | 2/2014 | Velusamy | H04W 64/00 455/404.2 |
| 2016/0234092 A1* | 8/2016 | Avery | H04L 43/16 |

* cited by examiner

ACCESSIBILITY OF APPLICATIONS BASED ON NETWORK CONNECTION TYPE

BACKGROUND

Some information handling devices (e.g., smart phones, cellular phones, tablets, smart watches, smart televisions, personal computers, etc.) allow users to transmit and receive data over a wired or wireless network connection. For example, devices may allow users to connect to a mobile communication network (e.g., 4G, 3G, Global System for Mobile Communications (GSM), etc.), Wireless Local Area Network (WLAN), satellite network, and the like. When connected to a network, a user can transmit and receive data over the network, for example, when the user connects to the Internet, stores data in a remote storage location, opens applications that transmit data, and the like. However, some applications transmit and receive large amounts of data over the network, which may cause an issue for the user depending on whether the network is a metered or non-metered network.

BRIEF SUMMARY

In summary, one aspect provides a method, comprising: connecting, using a network connection device of an information handling device, to a network; identifying, using a processor, a connection type of the network; identifying, using a processor, at least one characteristic of an application accessible by the information handling device; and modifying, based upon the connection type and at least one characteristic of an application, accessibility of the application.

Another aspect provides an information handling device, comprising: a network connection device; a processor operatively coupled to the network connection device; a memory device that stores instructions executable by the processor to: connect, using the network connection device, to a network; identify a connection type of the network; identify at least one characteristic of an application accessible by the information handling device; and modify, based upon the connection type and at least one characteristic of an application, accessibility of the application.

A further aspect provides a product, comprising: a storage device that stores code executable by a processor, the code being executable by the processor and comprising: code that connects, using a network connection device of an information handling device, to a network; code that identifies a connection type of the network; code that identifies at least one characteristic of an application accessible by the information handling device; and code that modifies, based upon the connection type and at least one characteristic of an application, accessibility of the application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As applications (e.g., games, text messaging, word processing, Internet browsers, video streaming, etc.) have become more prevalent, the data usage of applications has also increased. For example, social media applications now require larger amounts of data usage due to an increase in images, embedded videos, and the like, included within and accessible by the application. Thus, just the mere act of opening such an application causes large amounts of data to be transmitted or received over the network that the device is connected to. Additionally, the speed and bandwidth capabilities of network connections has increased, thereby increasing the appeal of applications which require the greater speed and bandwidth, for example, video applications, graphic intensive game applications, streaming applications, and the like.

Transmission and receipt of large amounts of data on a network connection may be a problem depending on whether the network is metered or non-metered. If the network is metered, the transmission and receipt of large amounts of data may become costly or the user may experience bandwidth throttling by the service provider. A metered network connection is a network connection where the user has an allowance of data usage for a particular time period (e.g., monthly, weekly, daily, etc.). As the user transmits and receives data over this type of network connection, the service provider monitors the data usage and counts it against the user's allowance. If the user goes above the data usage allowance, the user is typically billed for any amount of data that was used over the allowance. Alternatively, a user may have not have a data usage allowance, but as the user uses more data, the service provider starts to throttle the user's bandwidth, thereby slowing the transmission and receipt of data by the device.

The most common solution for a user to prevent going over the data allowance is for the user to monitor both the connection type (i.e., metered vs. non-metered) and how much data remains relating to their data usage allowance. A problem with this approach is that a user may not be aware of how much data an application is using, thereby causing the user to unknowingly go over their data usage allowance. Some service providers provide notifications to the user when the user is reaching their data usage allowance limit, but not all users on the account may receive the notification. For example, some service providers only send the notifications to the primary account holder. Additionally, the notifications may be sent through email or another source, so the user is not notified as the user is using the application. Rather, the user may only notice the notification after the user has already exceeded the data usage allowance.

Another problem with the user having to monitor the connection type is some users may not be aware of when they are connected to a metered connection. For example, the user may not know which network connections are metered and which are non-metered. Additionally, some devices automatically switch the user to a metered connection if the non-metered connection is weak or slow. For example, a device may switch a user from a Wi-Fi® connection to a 4G connection if the Wi-Fi® connection is weak. However, the user may not even notice that the connection type has changed. Wi-Fi is a registered trademark of The Wi-Fi Alliance in the United States and other countries.

Another problem that a user may encounter with a network connection is the security associated with the network connection. Applications exist for users to access bank accounts, stock accounts, personal data, corporate confidential data, and the like, from any device. If the user is connected to an unsecured network connection, the transmission of data may be compromised. One method to assist in helping connect to a secured connection is through the use of a virtual private network (VPN) connection. However, these types of connections are usually only available through corporate environments, so when a user is performing personal functions, for example, accessing a personal banking application, the data transmitted may be unsecured. Additionally, some connections may appear to be secured, but instead are connections that act as middlemen to capture the personal information before it is sent to the desired destination.

These technical issues present problems for users trying to limit the amount of data used on a metered network connection. Frequently, users may be unaware that they are connected to a metered connection. For example, due to devices automatically switching between different connection types. Even if the user is aware of the metered connection, the user may be unaware of how much data an application is transmitting and receiving over the network connection. Additionally, these technical issues present problems for users transmitting private or confidential data over a network connection. The user may not know if the connection is a secured connection. Additionally, the user may not remember they are on an unsecured network connection when they are transmitting confidential or private data.

Accordingly, an embodiment provides a method of modifying the accessibility of an application based upon the network connection type. An embodiment may connect to a network and then identify the connection type of the network. For example, an embodiment may identify whether the network connection is a metered or non-metered connection type. An embodiment may identify if the network connection is secured or unsecured. Once the connection type is determined, an embodiment may identify additional information about the network. For example, an embodiment may identify a data threshold associated with a metered connection. An embodiment may also identify a remaining amount of data usage in relation to the data threshold.

An embodiment may identify a characteristic of an application that is accessible by the device. For example, one embodiment may identify whether the application transmits and receives data over a network. An embodiment may identify how much bandwidth an application uses. As another example, an embodiment may identify whether the application transmits secured or confidential information over the network. Based upon the connection type and the identified characteristic, an embodiment may modify the accessibility of the application. For example, one embodiment may disable access to the application. As another example, one embodiment may disable particular features of the application.

The illustrated example embodiments will be best understood by reference to the figures. The following description is intended only by way of example, and simply illustrates certain example embodiments.

Figure 1:
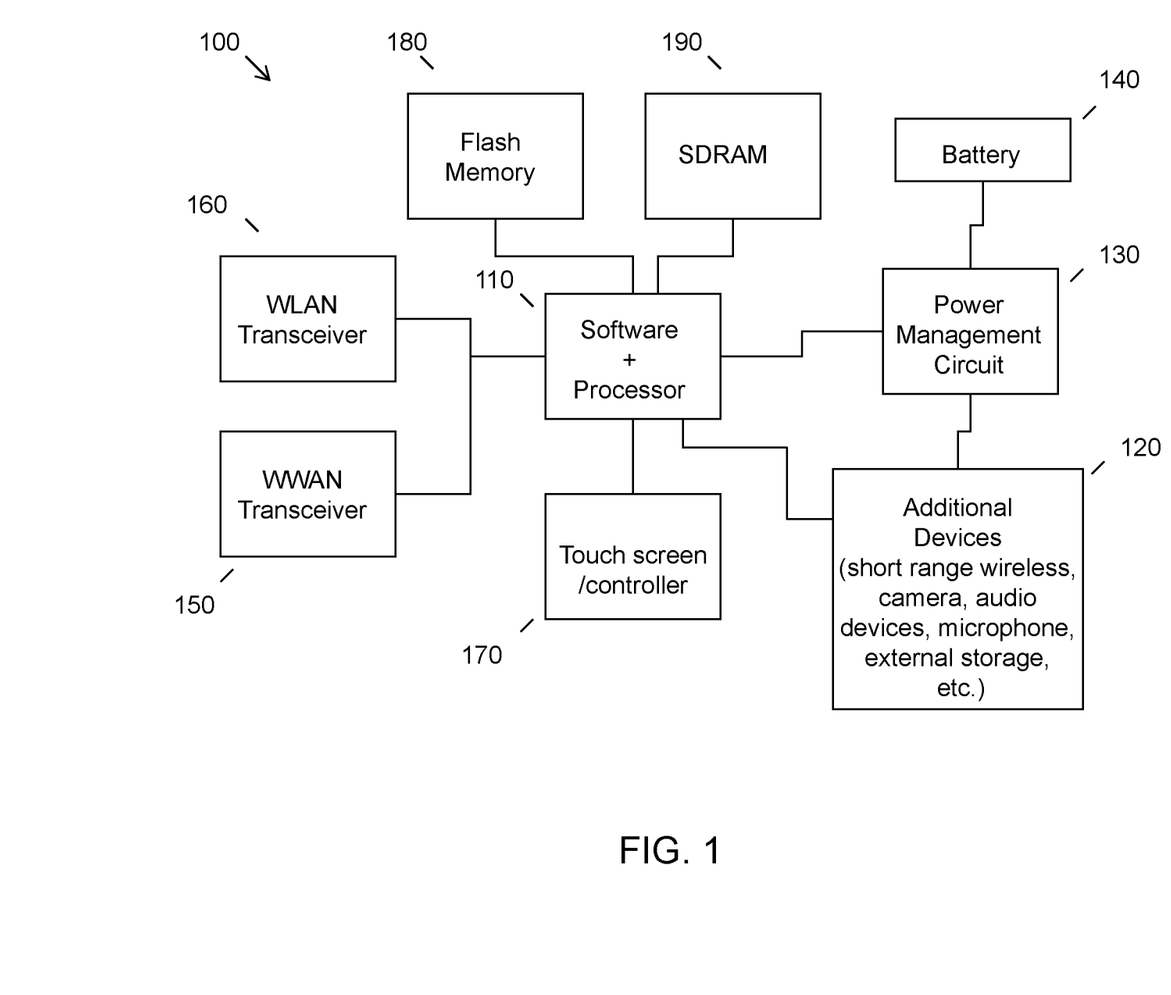
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., short range wireless communication devices, audio devices, etc. System 100 often includes a touch screen 170 for data input and display/rendering. System 100 also typically includes various memory devices, for example flash memory 180 and SDRAM 190.

Figure 2:
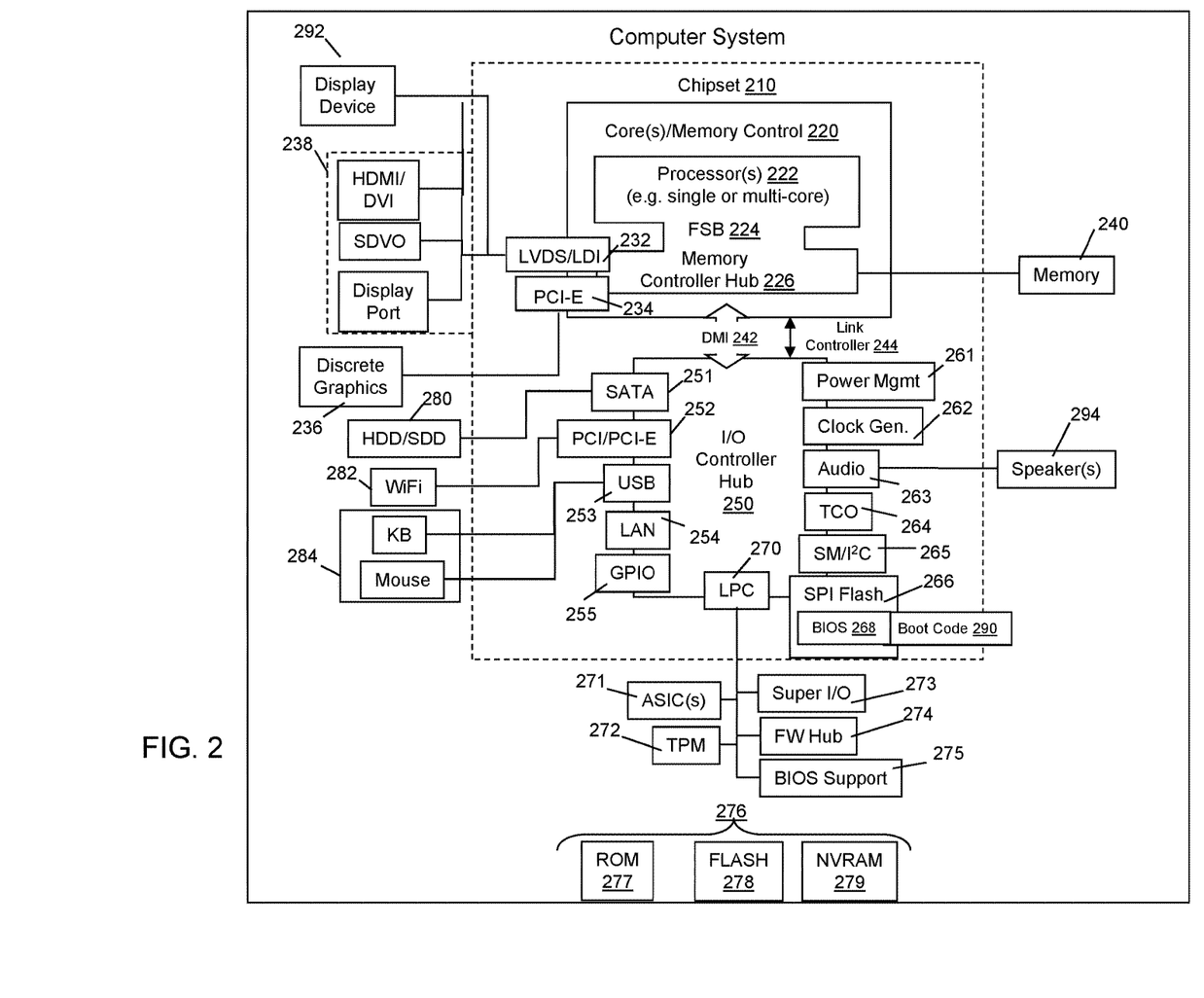
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, wireless communication devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to connect to networks. These devices may also be used by users to install and access applications. For example, the circuitry outlined in FIG. 1 may be implemented in a tablet or smart phone embodiment, whereas the circuitry outlined in FIG. 2 may be implemented in a personal computer embodiment.

Figure 3:
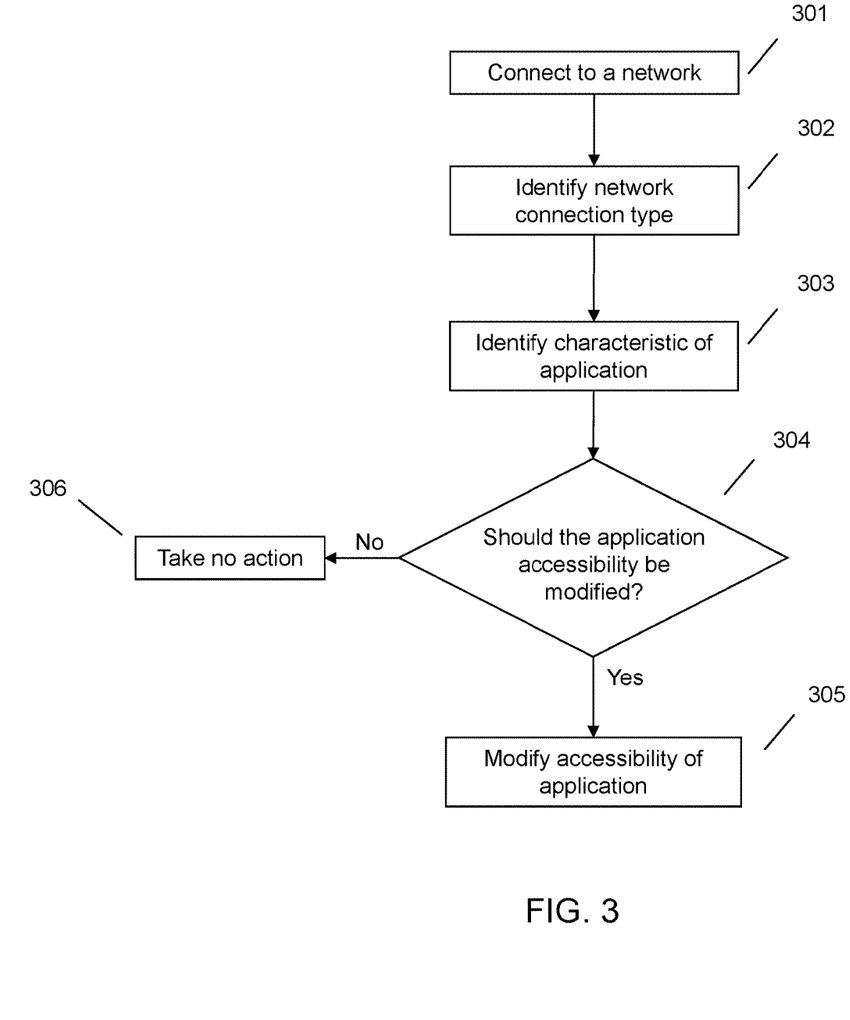
FIG. 3 illustrates an example method of modifying that accessibility of applications based on a network connection type.

Referring now to FIG. 3, an embodiment may connect to a network at 301. The connection may be completed using a network connection device of an information handling device ("device"). For example, a device may include a network connection card, WWAN transceiver, WLAN transceiver, and the like, as described in connection with FIGS. 1 and 2. At 302, an embodiment may identify the connection type of the network. In identifying the connection type, an embodiment may identify whether the connection is metered or non-metered. An embodiment may also identify whether the connection is secured or unsecured.

An embodiment may identify the connection type by determining the type of network connection, for example, 4G, 3G, satellite connection, Wi-Fi® connection, and the like. An embodiment may also identify the connection type by identifying how the device is connecting to the network, for example, which hardware the device is using to connect to the network, which protocol the device is using to communicate with the network, whether a password or passkey is required, and the like.

The connection type may also be identified by the user. For example, the user may provide input indicating that the connection is secured or unsecured. One embodiment may compare features (e.g., MAC address, IP address, name, signal strength, geographical location, etc.) of the network to a previously defined list of metered/non-metered and/or secured/unsecured networks. Other methods for identifying the connection type are contemplated and possible. For example, an embodiment may identify the network as a network that has been created by the user, nicknamed by the user, is a common network that the user connects to, is a public or private network, and the like. As an example, an embodiment may identify the network as a non-metered "home" network. In such a scenario, an embodiment may identify the network as being a non-metered secured network.

In addition to identifying the connection type, an embodiment may identify other characteristics associated with the network. For example, if an embodiment determines that the connection is a metered connection, an embodiment may determine a data threshold associated with the metered connection. The data threshold may include the data usage allowance. For example, if a user has a data plan with their mobile phone service provider, an embodiment may determine that the data plan includes 4 GB of data. In one embodiment, the data threshold may include an amount chosen by the user. For example, a user may not have a data usage allowance. Rather, the user knows that the service provider will throttle the bandwidth at 6 GB of data per month. The user may then identify 6 GB as the data threshold. The user may also wish to stay below a certain amount of data usage per usage period, for example, the user may want to decrease the data usage plan allowance, and may identify the desired data usage amount as the threshold.

An embodiment may also identify an amount remaining with respect to the data threshold. For example, if a user has a data threshold of 1 GB, and the user has used 250 MB, an embodiment may identify that the user has 750 MB remaining. An embodiment may additionally identify how long is remaining in the data usage period or a predefined time period. For example, an embodiment may identify that the data usage period resets the $15^{th}$ of every month and calculate how many days remain within the data usage period.

Using this information, an embodiment may identify how much data a user should not exceed per day remaining in the data usage period to remain under the data usage allowance. For example, if a user has five days remaining in the data usage period and 500 MB remaining in the data allowance, an embodiment may calculate that the user should not use more than 100 MB per day remaining in the data usage period. An embodiment may then use this number as the data threshold.

At 303, an embodiment may identify at least one characteristic of an application accessible by the information handling device. An application may be any software or computer program designed to run on a device, including built in software applications. For example, a smart phone may include social media applications, text messaging applications, games, word processing applications, banking applications, communication applications, and the like. Identification of the characteristic may occur when the user is attempting to access the application, at a predefined or user defined time period (e.g., every five minutes, every hour, etc.), at a predefined or user defined time (e.g., at 5:00 p.m. EST, at 15 minutes after the hours, etc.), when the user connects to a new network, and the like.

In one embodiment, the characteristic of the application may be associated with the data usage of the application. For example, one embodiment may identify the bandwidth requirements of the application. The bandwidth requirements may be based upon a test of the application, historical bandwidth requirements of the application, bandwidth requirements identified by the application, and the like. As another example, an embodiment may identify how much data a user has historically used when using the application. For example, a user may access a social media application multiple times throughout a day. An embodiment may identify an average amount of data used by the application per day. An embodiment may then attribute this average amount of data usage to the application. Thus, the characteristic of the application may include bandwidth requirements, frequency of use of the application, historical data usage over a defined time period, and the like.

The characteristic of the application may also include whether the application transmits secured or confidential information. This may include identifying whether personal information has to be entered into the application by the user. An embodiment may also identify whether the information transmitted by the application is encrypted. An embodiment may also simply identify a category associated with the application. For example, an embodiment may identify the application as a banking application and designate all banking applications as requiring a secured connection. A user may also define an application as necessitating a secured connection. Other characteristics of the application can be identified. For example, whether features can be disabled within the application to decrease bandwidth usage, whether features of the application do not require transmission of private or confidential information, and the like.

Based upon the connection type and the characteristic of the application, an embodiment may determine whether accessibility to the application should be modified at 304. To determine whether the accessibility should be modified, an embodiment may compare the characteristic of the application to the connection type. For example, if the application has been identified as requiring a secured connection, an embodiment may determine whether the connection type is secured. As another example, if an embodiment has identified the data usage requirement of the application, an embodiment may compare that requirement to the data remaining within the data usage allowance.

An embodiment may also identify how many days are remaining in the data usage time period. For example, an embodiment may identify that the user has used 80% of the data allowance, which has previously been identified as the data threshold at which accessibility to applications should be modified. However, an embodiment may also identify that the data usage period resets at the end of the current day. Based upon this additional information, an embodiment may not modify the accessibility of the application.

An embodiment may also simply identify how much data is remaining with respect to the data usage allowance and the time period that is remaining in the data usage period to determine whether accessibility to an application should be modified. In other words, an embodiment may not identify how much data the application may use and only allow access to applications that do not transmit or receive data based upon the amount of data a user has remaining. One embodiment may request user input on whether accessibility to the application should be modified. For example, an embodiment may notify the user that they have a certain amount of data remaining and that the application they are attempting to access will use a certain amount of data. Thus, the user may decide whether they want to access the application based upon this information. If an embodiment determines that the accessibility of an application should not be modified at 304, an embodiment may take no action at 306.

If, however, an embodiment identifies that the accessibility of an application should be modified, an embodiment may modify the accessibility of the application at 305. Modifying the accessibility of an application may include disabling the application. For example, if the user only has 1 kB of data remaining and the application will require 1 MB of data, an embodiment may disable the application. Disabling the application may include simply making the application unavailable, for example, by graying out the application, removing the application from the display screen, notifying the user that the application is unavailable, and the like.

In one embodiment, modifying the accessibility may include disabling or modifying features of the application. For example, if an application has only a single feature that transmits personal data, an embodiment may simply disable that feature of the application, but still allow access to the remaining features. As another example, if an application has embedded videos that require large amounts of bandwidth, an embodiment may simply not load the embedded videos, thereby reducing the bandwidth requirements of the application.

Modifying accessibility of an application may be accomplished using a phased approach. For example, an embodiment may identify the applications which require or use the most data or the applications which are most frequently used. If a first threshold is reached, for example, the user has used 50% of the data allowance, the three applications using the most data or are most frequently used may be modified. If a second threshold is reached, for example, the user has used 75% of the data allowance, the next three applications using the most data or are most frequently used may be modified. As can be understood, more than two thresholds may be implemented. Additionally, the number of applications modified may also vary.

In one embodiment, modifying accessibility to the application may be overridden by the user. For example, an application may be disabled, but the user may want to access the application. To access the disabled application, a user may be required to enter a password or acknowledge that they want to access the application. In acknowledging the access to the application, an embodiment may inform the user of the reason why access to the application has been disabled. For example, if a user wants to access to a map application that uses more data than is remaining with respect to the data allowance, an embodiment may provide a notification stating such and requesting the user to confirm the action.

The various embodiments described herein thus represent a technical improvement to current techniques for monitoring data usage with respect to a data threshold or allowance. Additionally, the various embodiments as described herein represent a technical improvement to current techniques for monitoring the transmission of confidential or private information based upon the connection type. Using the techniques described herein, a user does not have to manually identify whether they are connected to a metered or secured network connection. The techniques described herein provide a method for automatically modifying the accessibility of applications based upon the network connection type. Thus, allowing a user to access applications without having to worry about whether they will exceed the data usage allowance or send confidential information over an unsecured network connection.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   connecting, using a network connection device of an information handling device, to a network;
   identifying, using a processor, a connection type of the network, wherein the identifying a connection type comprises identifying a metering associated with the connection type and a security level associated with the connection type;
   identifying, using a processor, at least one characteristic of an application accessible by the information handling device, wherein the identifying comprises identifying the at least one characteristic when a user is accessing the application, wherein the identified at least one characteristic is related to the identified connection type and a category associated with the application, wherein the category is based on a confidentiality of data; and
   modifying, based upon the connection type, the at least one characteristic of an application, and a characteristic related to a data usage period, accessibility of the application, wherein the modifying comprises comparing the at least one identified characteristic to the identified connection type and disabling the application by selectively preventing transmittal of selective information over the identified connection type based upon the security level associated with the connection type and the category associated with the application, while permitting the application to perform functions unrelated to the transmittal of the selective information.

2. The method of claim 1, wherein the identifying at least one characteristic comprises identifying a bandwidth requirement of the application.

3. The method of claim 1, wherein the identifying at least one characteristic comprises identifying a frequency of use of the application.

4. The method of claim 1, further comprising identifying a data threshold associated with the metered connection.

5. The method of claim 4, wherein the modifying comprises disabling access to the application based upon the data threshold.

6. The method of claim 4, further comprising identifying a remaining amount of data related to the data threshold.

7. The method of claim 6, wherein the modifying comprises disabling access to the application based upon the remaining amount of data.

8. The method of claim 6, further comprising identifying a bandwidth requirement of the application and disabling access to the application based upon the bandwidth requirement in relation to the remaining amount of data.

9. The method of claim 6, wherein the modifying comprises disabling features of the application based upon the remaining amount of data.

10. An information handling device, comprising:
a network connection device;
a processor operatively coupled to the network connection device;
a memory device that stores instructions executable by the processor to:
connect, using the network connection device, to a network;
identify a connection type of the network, wherein the identifying a connection type comprises identifying a metering associated with the connection type and a security level associated with the connection type;
identify at least one characteristic of an application accessible by the information handling device, wherein the identifying comprises identifying the at least one characteristic when a user is accessing the application, wherein the identified at least one characteristic is related to the identified connection type and a category associated with the application, wherein the category is based on a confidentiality of data; and
modify, based upon the connection type, the at least one characteristic of an application, and a characteristic related to a data usage period, accessibility of the application, wherein to modify comprises comparing the at least one identified characteristic to the identified connection type and disabling the application by selectively preventing transmittal of selective information over the identified connection type based upon the security level associated with the connection type and the category associated with the application, while permitting the application to perform functions unrelated to the transmittal of the selective information.

11. The information handling device of claim 10, wherein the instructions executable by the processor to identify at least one characteristic comprise instructions executable by the processor to identify a bandwidth requirement of the application.

12. The information handling device of claim 10, wherein the instructions executable by the processor to identify at least one characteristic comprise instructions executable by the processor to identify a frequency of use of the application.

13. The information handling device of claim 10, wherein the instructions executable by the processor further comprise instructions executable by the processor to identify a data threshold associated with the metered connection.

14. The information handling device of claim 13, wherein the instructions executable by the processor to modify comprise instructions executable by the processor to disable access to the application based upon the data threshold.

15. The information handling device of claim 13, wherein the instructions executable by the processor further comprise instructions executable by the processor to identify a remaining amount of data related to the data threshold.

16. The information handling device of claim 15, wherein the instructions executable by the processor to modify comprise instructions executable by the processor to disable access to the application based upon the remaining amount of data.

17. The information handling device of claim 15, the instructions executable by the processor further comprise instructions executable by the processor to identify a bandwidth requirement of the application and instructions executable by the processor to disable access to the application based upon the bandwidth requirement in relation to the remaining amount of data.

18. A product, comprising:
a storage device that stores code, the code being executable by a processor and comprising:
code that connects, using a network connection device of an information handling device, to a network;
code that identifies a connection type of the network, wherein the identifying a connection type comprises identifying a metering associated with the connection type and a security level associated with the connection type;
code that identifies at least one characteristic of an application accessible by the information handling device, wherein the identifying comprises identifying the at least one characteristic when a user is accessing the application, wherein the identified at least one characteristic is related to the identified connection type and a category associated with the application, wherein the category is based on a confidentiality of data; and
code that modifies, based upon the connection type, the at least one characteristic of an application, and a characteristic related to a data usage period, accessibility of the application, wherein the code that modifies comprises code that compares the at least one identified characteristic to the identified connection type and disabling the application by selectively preventing transmittal of selective information over the identified connection type based upon the security level associated with the connection type and the category associated with the application, while permitting the application to perform functions unrelated to the transmittal of the selective information.

* * * * *